United States Patent [19]

Geboers et al.

[11] 4,388,498

[45] Jun. 14, 1983

[54] VOLTAGE STABILIZER SUITABLE FOR USE IN A TELEPHONE SET

[75] Inventors: Josephus J. A. Geboers; Daniel J. G. Janssen, both of Eindhoven, Netherlands

[73] Assignee: U.S. Philips Corporation, New York, N.Y.

[21] Appl. No.: 191,102

[22] Filed: Sep. 26, 1980

[30] Foreign Application Priority Data

Oct. 1, 1979 [NL] Netherlands ......................... 7907276

[51] Int. Cl.³ ............................................. H04M 1/00
[52] U.S. Cl. .................................. 179/81 R; 179/16 F
[58] Field of Search ................. 179/16 F, 81 R, 81 A, 179/170.2, 170.8, 70, 77

[56] References Cited

U.S. PATENT DOCUMENTS 3,973,082  8/1976  van der Plaats ................. 179/81 R
3,989,902  11/1976  Cowpland ......................... 179/81 R Primary Examiner—Joseph A. Popek Attorney, Agent, or Firm—Thomas A. Briody; William J. Streeter; Laurence A. Wright

[57] ABSTRACT

Voltage stabilizer for use in a telephone instrument, comprising the series arrangement of the main current paths of two transistors (4, 6) and a voltage divider (8, 9) connected in parallel therewith connected between first (1) and second (2) terminals. The bases of the transistors (3, 5) are connected to the voltage divider. The transistors (3, 5) and (4, 6) are connected in the Darlington pair configuration. In addition, in order to obtain a high AC impedance, the stabilizer includes a capacitor (11) which is arranged between the bases of transistors (3, 5) and terminal (2) to which the emitter of the second transistor (6) is coupled. To reduce the switch-on time of the stabilizer, a thyristor (13, 14) is provided between the first terminal (1) and the base of the first transistor (3) and a voltage divider (17, 18) whose tap (19) is connected to the cathode gate of the thyristor circuit is connected between the first terminal (1) and the junction of the main current paths of the transistors (4, 6).

1 Claim, 1 Drawing Figure

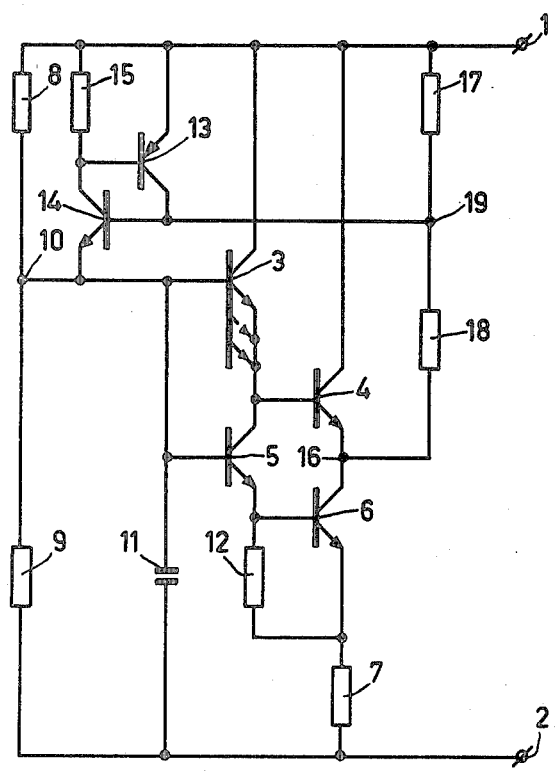

VOLTAGE STABILIZER SUITABLE FOR USE IN A TELEPHONE SET

The invention relates to a voltage stabiliser which is suitable for use in a telephone instrument.

BACKGROUND OF THE INVENTION

In order to increase the alternating current impedance of the stabiliser between the first and second terminals and to reduce the internal dissipation, it has been proposed in a co-pending application for the stabiliser to comprise a resistor and a second transistor, whose main current path is connected in series with the resistor and the main current path of the first transistor, and for the base of the second transistor circuit to be connected to a tap on the voltage divider.

The terminals of such a voltage stabiliser are connected to the subscriber's line via the hook contact. When the receiver is removed from the cradle a charging current is caused to flow from the supply source of an exchange to the capacitor via the subscriber's line and to the voltage divider portion which is connected between the first terminal and the base of the first transistor circuit. In combination with the said portion of the voltage divider, the capacitor forms a low-pass filter which should be capable of attenuating low frequency alternating voltages and not form a load for the line. Hence, the low-pass filter has a very long time constant. In addition, the subscriber's line is capacitive by nature, which opposes line voltage variations.

It is, however, desirable that the voltage stabiliser attains and maintains a stable final value very shortly after switch-on.

It is an object of the invention to provide in a very simple manner a very short switch-on period for the voltage stabiliser without an increase in the sensitivity of the stabiliser to disturbances.

SUMMARY OF THE INVENTION

The invention is characterized in that the stabiliser comprises a resistor and a second transistor whose main current path is connected in series with the resistor between the main current path of the first transistor circuit and the second terminal, and the base of the second transistor is connected to a tap on the voltage divider, that a thyristor having an anode gate and a cathode gate is connected between the first terminal and the base of the first transistor, the anode gate being coupled to the first terminal, and that a second voltage divider, whose tap is connected to the cathode gate of the thyristor, is connected between the first terminal and the junction of the first and second transistors.

BRIEF DESCRIPTION OF THE DRAWING

An embodiment of the invention and its advantages will now be further explained by way of example with reference to the embodiment shown in the accompanying drawing.

DETAILED DESCRIPTION OF THE PREFERRED EMBODIMENT

The voltage stabiliser is connected by means of its terminals 1 and 2 to a subscriber's line via a hook contact, not shown. For the stabilisation of the voltage between the terminals, the stabiliser comprises the series arrangement of two transistor circuits implemented as Darlington connected transistor pairs 3, 4 and 5, 6 with a resistor 7 and, connected in parallel therewith, a first voltage divider 8, 9, whose tap 10 is connected to the bases of the first transistors 3 and 5 of each Darlington pair. Further, a capacitor 11 is connected between the tap 10 of the potential divider and the terminal 2, and the base-emitter junction of the second transistor 6 of the Darlington pair of transistors 5 and 6 is shunted by a resistor 12. Instead of Darlington transistors, single transistors may alternatively be used.

The circuit described so far operates as follows:

On closure of the hook contact, not shown, the voltage between the terminals 1 and 2 increases from zero Volt. As soon as the voltage at the tapping point 10 exceeds the base-emitter voltage of the second pair of transistors 5, 6 being $\pm 0.6$ Volt, in response to the current flowing in the voltage divider, the second pair of transistors 5, 6 is rendered conductive. The first pair of transistors 3, 4 is rendered conductive simultaneously with the second pair of transistors 5, 6.

The voltage between the terminals 1 and 2 is equal to the ratio between the resistors 8, 9 and the resistor 7, multiplied by the base-emitter voltage of the second pair of transistors 5, 6.

When the voltage between the terminals increases at a rate which is slower than the time constant determined by the values of the resistor 8, the resistor 9 and the capacitor 11 connected in parallel therewith for alternating current, the capacitor 11 will be charged further and the voltage at the bases of the first and second pairs of transistors 3, 4 and 5, 6 increases in proportion to the voltage across the stabiliser, causing the stabiliser to carry a larger current. This larger current which is applied by the voltage source in the telephone exchanger over the subscriber's line to the terminals, causes a larger voltage drop across the line resistors of this subscriber's line which voltage drop opposes the increase of the voltage between the terminals 1 and 2. The reverse holds for a slow decrease of the voltage between the terminals 1 and 2.

For a certain bias current of the pairs of transistors 3, 4 and 5, 6, the voltage across the stabiliser remains substantially constant, neglecting the voltage increase caused by the resistor 7. For a change in the voltage between the terminals which is faster than the said charging time constant such as for speech and multi-frequency dialing tone signals, capacitor 11 forms almost a short-circuit, so that the said voltage range is not applied to the base of transistors 1 and 2. The alternating current impedance of the stabiliser is therefore determined by the value of resistor 8 and the impedance seen in the collector of the first pair of transistors 3, 4.

This collector impedance is inter alia determined by the value of the impedance in the emitter circuit of the first pair of transistors 3, 4 which is high because of the fact that the second pair of transistors 5, 6 is arranged in cascade with the first pair of transistors 3, 4.

The magnitude of the collector impedance depends on the presence of resistor 7, as, in response to voltage excursions of the collector voltage of the pair of transistors 5, 6 across this resistor, currents through this resistor 7 produce voltage changes which are in phase with those of the collector of this pair of transistors.

As a result thereof the voltage excursion of the collector-emitter voltage of the second pair of transistors 5, 6 is smaller than the voltage excursion of the collector of the second pair of transistors 5, 6 with respect to the second terminal 2, which means a larger alternating current impedance of the collector than in the case where resistor 7 is absent.

However, resistor 7 has a further important function of increasing the linearity of the circuit for alternating current by reducing the influence of the nonlinear behaviour of the base-emitter diode of the second pair of transistors 5, 6 on the base current.

The most significant reason for the increase in the alternating current impedance of the stabiliser is, however, the fact that the collector voltage of the second pair of transistors 5, 6 for alternating voltages is determined by the base voltage and the base-emitter voltage of the first pair of transistors 3, 4. Owing to the fact that capacitor 11 holds the base voltage of the first pair of transistors constant at the direct voltage value determined by the voltage divider by short-circuiting the alternating voltage and that the base-emitter voltage of a transistor varies only little in response to large collector voltage changes, the collector voltage of the second pair of transistors 5, 6 is substantially constant, which results in a high alternating voltage impedance.

In addition, it is a property of a transistor that large collector current changes can be obtained at relatively small changes in the base-emitter bias voltage. This means that the collector voltage of the second pair of transistors 5, 6 need change only little for a wide direct current control range of the voltage stabiliser, which also results in a substantially constant alternating voltage impedance.

Because of these properties of the circuit, the value of resistor 7 may be low, as it now mainly serves to produce the linear character of the impedance. It was found that in practice a resistance of 5 to 6 Ohm is sufficient.

From the above description it will be apparent that for an adequate operation of the stabiliser it is required that resistor 8 and capacitor 11 operate as a low-pass filter, the filter having a long time constant.

When the hook contact is closed, voltage is applied to both terminals 1 and 2, causing the capacitor to be charged. The problem is then encountered that capacitor 11 is charged by way of resistor 8 and that the stabiliser does not start operating until after the said long time constant. To overcome this problem, the stabiliser includes a thyristor circuit, formed by the transistors 13 and 14, which is connected between the terminal 1 and the tap 10 of the first voltage divider and whose anode gate is connected with the first terminal via a resistor 15.

In addition, a second voltage divider 17, 18, whose tap 19 is connected to the cathode gate of the thyristor, is provided between the first terminal and the mutual junction 16 of the transistors 4 and 6.

This switching-on circuit operates as follows.

In the off-hook condition, the voltages of the terminals 1 and 2 are equal to one another, so that the Darlington transistors are non-conductive. Then, the junction between the Darlington transistors 4 and 6 has a high impedance.

On closure of the hook contact, the voltage between the terminals will increase comparatively slowly under the influence of the capacitive character of the subscriber's line. As junction 16 floats, the tap 19 of the second voltage divider will immediately follow the voltage increase of terminal 1. This results in that the voltage of the cathode gate immediately follows the voltage of the first terminal, so that the thyristor will already be fired at a low voltage between the terminals, causing the capacitor 11 to be charged rapidly via the thyristor.

During this rapid charging, the voltage across capacitor 11 reaches and then exceeds the base-emitter voltage of the first transistor 5 of the second Darlington transistor 5, 6, and also the first transistor 3 of the first Darlington transistor becomes conductive and the stabiliser reaches a stable final value a very short period of time after closure of the hook contact.

As soon as the second transistor 6 is rendered conductive by the first transistor of the second Darlington pair of transistors, the voltage at the junction 16 is determined by the collector voltage of the second transistor 6 which is then low.

As a result thereof the current flowing through resistor 17 will flow to the tap 16 and the current applied to the cathode gate will reverse its direction and be discharged to the second terminal via the transistor 6 and resistor 7. Consequently, the charging current of the thyristor will be approximately 300 μA.

In response to a further increase of the current through the stabiliser the current through the thyristor will decrease, causing it to be rendered non-conductive.

The voltage stabiliser having this starter circuit has the advantage that during operation of this stabiliser the thyristor cannot be fired by noise voltages, as the voltage of the cathode gate is and remains low.

The thyristor cannot be fired again until after the stabiliser has been switched off by the opening of the hook contact.

What is claimed is:

1. A voltage stabiliser suitable for a telephone set comprising:
    first and second terminals,
    first and second resistors,
    a first transistor having a first current path which is coupled between said first and second terminals by means of said first and second resistor,
    a first voltage divider connected between said terminals, a first tap of said first voltage divider being connected to the base of said first transistor,
    a capacitor connected between the base of said first transistor and said second terminal to which the emitter of said first transistor is also coupled through said first and second resistors,
    a second transistor having a second current path connected in series with said second resistor and said first and second terminals, the base of said second transistor being connected to the junction of the emitter of said first transistor and said first resistor,
    a third resistor,
    a thyristor having an anode gate and a cathode gate, said anode gate being connected through said third resistor to said first terminal and to the base of said first transistor by means of the emitter terminal of said thyristor, and
    a second voltage divider having a tap connected to said cathode gate of said thyristor, said second voltage divider being connected between said first terminal and the collector terminal of said second transistor.

* * * * *